United States Patent
Kolbe et al.

(10) Patent No.: US 11,838,179 B2
(45) Date of Patent: Dec. 5, 2023

(54) OPERATION OF A BROADBAND ACCESS NETWORK OF A TELECOMMUNICATIONS NETWORK

(71) Applicant: Deutsche Telekom AG, Bonn (DE)

(72) Inventors: Hans-Joerg Kolbe, Darmstadt (DE); Thomas Haag, Rodgau (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/800,912

(22) PCT Filed: Mar. 2, 2021

(86) PCT No.: PCT/EP2021/055210
§ 371 (c)(1),
(2) Date: Aug. 19, 2022

(87) PCT Pub. No.: WO2021/175867
PCT Pub. Date: Sep. 10, 2021

(65) Prior Publication Data
US 2023/0076946 A1 Mar. 9, 2023

(30) Foreign Application Priority Data
Mar. 6, 2020 (EP) .................... 20161506

(51) Int. Cl.
*G06F 15/177* (2006.01)
*H04L 41/082* (2022.01)
(Continued)

(52) U.S. Cl.
CPC ........ *H04L 41/082* (2013.01); *H04L 41/0895* (2022.05); *H04L 41/32* (2013.01);
(Continued)

(58) Field of Classification Search
CPC ... H04L 41/082; H04L 41/0895; H04L 41/32; H04L 41/342; H04L 41/40;
(Continued)

(56) References Cited

U.S. PATENT DOCUMENTS 10,063,415 B1* 8/2018 Kanakarajan ......... H04L 41/342
2017/0187607 A1* 6/2017 Shaikh .................... H04L 41/40
(Continued)

OTHER PUBLICATIONS

Proenca Jorge et al, "Virtualization of Residential Gateways: A Comprehensive Survey", IEEE Communications Surveys & Tutorials, vol. 21, No. 2, Oct. 2018, p. 1462-1482, XP011727891.

*Primary Examiner* — Richard G Keehn
(74) *Attorney, Agent, or Firm* — LEYDIG, VOIT & MAYER, LTD.

(57) ABSTRACT

A method for operation of a broadband access network of a telecommunications network includes: in a first step, a program or configuration information is provided to or received by an orchestrator node or functionality; in a second step, subsequent to the first step, at least one piece of program or control information is provided or transmitted to at least one programmable network node; and in a third step, subsequent to the second step, the at least one piece of program or control information is activated to be executed by the at least one programmable network node.

11 Claims, 4 Drawing Sheets

(51) Int. Cl.
*H04W 12/084* (2021.01)
*H04L 41/342* (2022.01)
*H04L 41/0895* (2022.01)
*H04L 41/40* (2022.01)
*H04L 41/00* (2022.01)

(52) U.S. Cl.
CPC ............ *H04L 41/342* (2022.05); *H04L 41/40* (2022.05); *H04W 12/084* (2021.01)

(58) Field of Classification Search
CPC ............ H04L 41/0806; H04L 41/5051; H04L 41/5054; H04L 12/2801; H04W 12/084
See application file for complete search history.

(56) References Cited

U.S. PATENT DOCUMENTS

| | | | |
|---|---|---|---|
| 2018/0176177 A1* | 6/2018 | Bichot | H04L 41/40 |
| 2018/0314808 A1* | 11/2018 | Casey | H04L 41/082 |
| 2020/0007413 A1* | 1/2020 | Kerpez | H04L 41/40 |
| 2020/0028744 A1* | 1/2020 | Rice | H04L 41/5054 |

* cited by examiner

US 11,838,179 B2

OPERATION OF A BROADBAND ACCESS NETWORK OF A TELECOMMUNICATIONS NETWORK

CROSS-REFERENCE TO PRIOR APPLICATIONS

This application is a U.S. National Phase application under 35 U.S.C. § 371 of International Application No. PCT/EP2021/055210, filed on Mar. 2, 2021, and claims benefit to European Patent Application No. EP 20161506.9, filed on Mar. 6, 2020. The International Application was published in English on Sep. 10, 2021 as WO 2021/175867 A1 under PCT Article 21(2).

FIELD

The present invention relates to a method for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

Furthermore, the present invention relates to a broadband access network or telecommunications network for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

Additionally, the present invention relates to a programmable network node for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

Additionally, the present invention relates to a system for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

Furthermore, the present invention relates to a program and a computer-readable medium for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current broadband access network architecture(s), the degree of freedom regarding the implemented services or regarding their flexibility is typically limited by the policy capabilities and the languages used, both typically specific to the vendor of hardware components or network nodes of the broadband access network. Hence, an efficient way of realizing a more flexible or more flexibly configurable operation of the broadband access network is required.

SUMMARY

In an exemplary embodiment, the present invention provides a method for operation of a broadband access network of a telecommunications network. The broadband access network comprises and/or is connected to a plurality of network nodes. The plurality of network nodes comprise at least one programmable network node. The broadband access network or a part thereof provides on or at the at least one programmable network node a customer-specific or subscriber-specific programmability. The broadband access network or the part thereof comprises an orchestrator node or functionality. The method includes: in a first step, a program or configuration information is provided to or received by the orchestrator node or functionality; in a second step, subsequent to the first step, at least one piece of program or control information is provided or transmitted to the at least one programmable network node; and in a third step, subsequent to the second step, the at least one piece of program or control information is activated to be executed by the at least one programmable network node.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
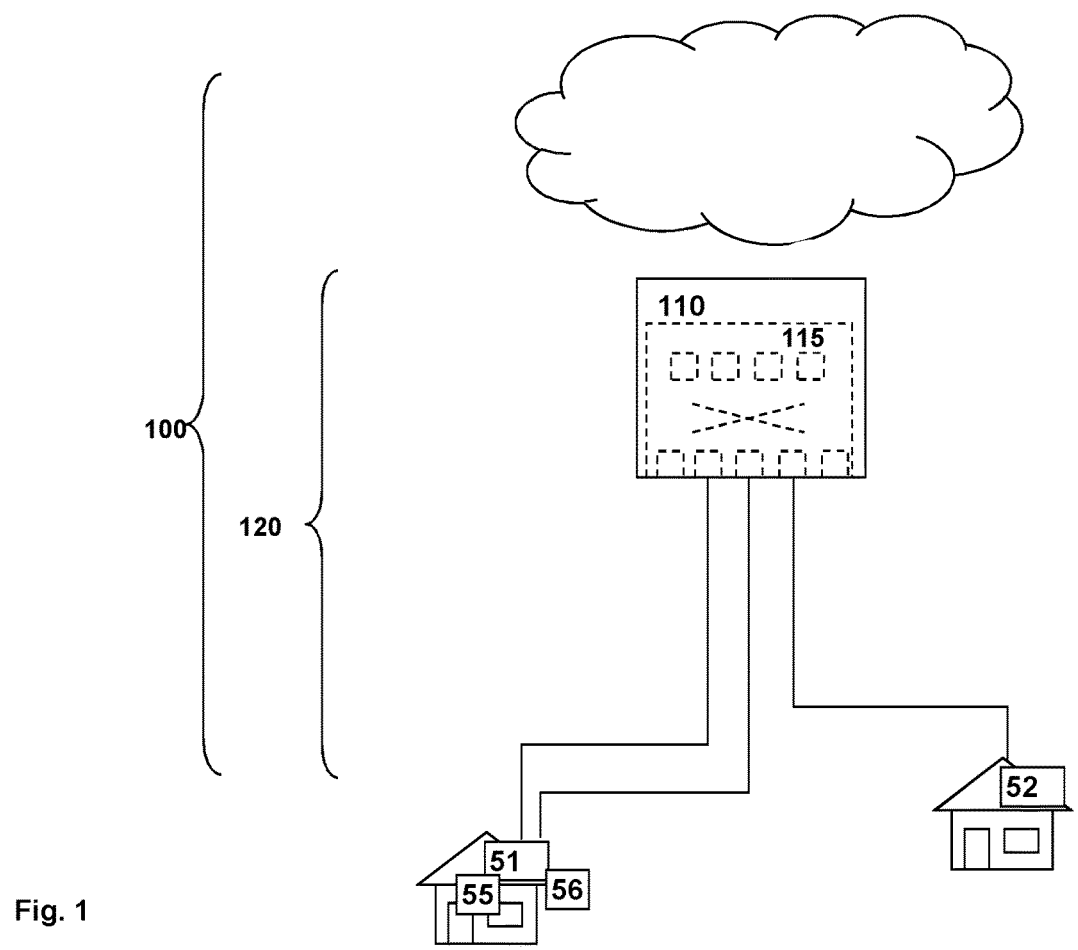
FIG. 1 schematically illustrates a telecommunications network according to the present invention, having a broadband access network with a central office point of delivery.

Exemplary embodiments of the present invention provide a technically simple, effective and cost effective solution for improved operation of a broadband access network of a telecommunications network and/or for improved and/or more flexible or more flexibly configurable operation of the broadband access network, the broadband access network comprising and/or being connected to a plurality of network nodes comprising at least one programmable network node.

Exemplary embodiments of the present invention further provide a corresponding broadband access network or telecommunications network, a corresponding programmable network node or an orchestrator node or functionality and a corresponding system for improved operation of a broadband access network of a telecommunications network and/or for improved and/or more flexible or more flexibly configurable operation of the broadband access network.

In an exemplary embodiment, the present invention provides a method for improved operation of a broadband access network of a telecommunications network and/or for improved and/or more flexible or more flexibly configurable operation of the broadband access network, the broadband access network comprising and/or being connected to a plurality of network nodes, wherein the plurality of network nodes comprise at least one programmable network node, wherein the broadband access network or a part thereof provides on or at the at least one programmable network node a customer-specific or subscriber-specific programmability, wherein the broadband access network or the part thereof comprises an orchestrator node or functionality, wherein in order for improved and/or more flexible or more flexibly configurable operation of the broadband access network, the method comprises the following steps:

in a first step, a program or configuration information is provided to or received by the orchestrator node or functionality, in a second step, subsequent to the first step, at least one piece of program or control information is provided or transmitted to the at least one programmable network node, in a third step, subsequent to the second step, the at least one piece of program or control information is activated to be executed by the respective at least one programmable network node.

It is thereby advantageously possible according to the present invention to provide a solution such that the lack of programmability of network nodes in broadband access networks can be avoided or at least reduced.

Such lack of programmability is typically quite a huge burden to the network operator as the degree of freedom (or the flexibility) of the services the telecommunications network is able to deliver is determined by the policy capabilities and the language, both conventionally being often vendor specific. In such a scenario, the dynamic changes are very limited, as such changes typically need to be communicated by a customer (e.g. a large enterprise that needs a re-configuration of the access lists of their VPN branch sites) and then translated into policies implementing such a request for modifications; only such implementations of the requested changes are later able to be rolled out. This process typically takes a rather long time, is tedious and involves quite an important number of manual steps.

According to the present invention, it is advantageously possible to provide for a more flexible or more flexibly configurable operation of the broadband access network. The broadband access network comprises or is connected to a plurality of network nodes comprising at least one programmable network node (but typically a plurality of programmable network nodes). Such programmable network nodes (e.g. service nodes like home gateways or IP edge nodes) might be provided in the form of x86-based systems. According to the present invention, the broadband access network (or at least a part thereof) provides—on or at the at least one programmable network node—a customer-specific or subscriber-specific programmability, especially via an orchestrator node or functionality. The steps according to the present invention, and in order for improved and/or more flexible or more flexibly configurable operation of the broadband access network, include the following:

in a first step, a program or configuration information is provided to or received by the orchestrator node or functionality, in a second step, subsequent to the first step, at least one piece of program or control information is provided or transmitted to the at least one programmable network node, in a third step, subsequent to the second step, the at least one piece of program or control information is activated to be executed by the respective at least one programmable network node.

According to the present invention it is thereby advantageously possible for a network operator to provide—to their customers—the possibility to change, at least to a limited extent, the behavior of the telecommunications network or of the broadband access network according to the requirements of the customers. Hence, an increased level of flexibility can be provided according to the present invention. Especially, it is advantageously possible according to the present invention to use programmable network nodes in order to use these nodes and make them programmable, for the customers of the broadband access network and/or the telecommunications network, in an automated manner, hence creating an enhanced level of flexibility such that tailor-made services are possible to be provided and implemented comparatively fast. According to the present invention, a maximum level of programmability is able to be enabled in the broadband access network and/or in the telecommunications network, in order to allow creating services on the fly in an orchestrated manner.

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

Furthermore, it is advantageously possible and preferred according to the present invention that the at least one piece of program or control information corresponds to or consists of a part of a service chain for the IP traffic of a customer or subscriber of the broadband access network and/or of the telecommunications network, wherein especially the service chain is orchestrated by the orchestrator node or functionality, and wherein especially the activity or inactivity or execution or implementation of the piece of program or control information corresponds to a state out of one or a plurality of the following: loaded, configured, activated, paused, terminated, deleted, changed.

Thereby, it is advantageously possible according to the present invention to flexibly, and tailor-made according to customer requirements, modify and adapt the functionality of the communication service chain implemented by the broadband access network.

According to a further preferred embodiment of the present invention, the broadband access network or the part thereof comprises a software defined network or policy node or functionality, wherein—besides the at least one programmable network node—the plurality of network nodes comprise at least one configurable network node, wherein in a fourth step, subsequent to the first step, the at least one configurable network node receives at least one piece of configuration or policy information from the software defined network or policy node or functionality, wherein especially the at least one piece of configuration or policy information matches or is adapted to the at least one piece of program or control information such that, via both the at least one piece of program or control information and the at least one piece of configuration or policy information, the service chain for the IP traffic of the customer or subscriber is able to be implemented in a customer-specific or subscriber-specific way, wherein especially a service chain comprises or is implemented by, in sequence, a first piece of configuration or policy information, the at least one piece of program or control information, and a second piece of configuration or policy information.

Thereby, it is advantageously possible according to the present invention to configure both programmable network nodes and (only) configurable network nodes.

According to a further embodiment of the present invention, the orchestrator node or functionality comprises or is connected to at least one program interface wherein via the at least one program interface the at least one piece of program or control information is provided or transmitted to the at least one programmable network node, wherein especially the orchestrator node or functionality provides a dynamic interface to receive the program or configuration information from the customer or subscriber, and wherein especially a syntax check and/or a security check and/or a consistency check is performed—especially by the orchestrator node or functionality and/or by the at least one program interface, and especially against predefined syntax and/or security and/or consistency rules—and/or meta information processed.

Thereby, it is advantageously possible to provide an increased level of ease to modify and customize the service chain implemented by the broadband access network.

Furthermore, according to a preferred embodiment of the present invention, the at least one piece of program or control information realizes or is part of the service chain for the IP traffic of a customer or subscriber, this IP traffic comprising at least one stream of data packets, wherein the at least one piece of program or control information is related to at least one out of the following:
 a filter functionality for filtering data packets and/or filtering the content of data packets,
 a classifier functionality for classifying data packets,
 a labelling functionality for labeling data packets.

Thereby, it is advantageously possible to easily and effectively implement the method according to an embodiment of the present invention.

According to a further embodiment of the present invention, the at least one programmable network node corresponds to or comprises
 at least one customer premises equipment of or associated to or assigned to the customer or subscriber,
 at least one access node as part of the broadband access network, the at least one access node especially handling communication sessions for or associated to the customer or sub scriber,
 at least one service edge network node as part of the broadband access network, the at least one service edge network node especially handling communication sessions for or associated to the customer or subscriber,
 at least one leaf network node as part of the broadband access network.

According to a further embodiment of the present invention, the broadband access network comprises a central office point of delivery with a plurality of service edge network nodes, each one of the service edge network nodes preferably realizing at least one service edge instance or functionality, terminating a customer communication link towards a customer premises equipment or an access node.

Furthermore, according to an embodiment of the present invention, the central office point of delivery comprises a switching fabric, the switching fabric comprising a plurality of spine network nodes and a plurality of leaf network nodes, wherein the leaf network nodes correspond to or host or co-host the service edge network nodes.

Thereby, it is advantageously possible to easily and effectively implement the method according to an exemplary embodiment of the present invention.

Furthermore, the present invention relates to a broadband access network or telecommunications network for improved operation of a broadband access network of a telecommunications network and/or for improved and/or more flexible or more flexibly configurable operation of the broadband access network, the broadband access network comprising and/or being connected to a plurality of network nodes, wherein the plurality of network nodes comprise at least one programmable network node, wherein the broadband access network or a part thereof provides on or at the at least one programmable network node a customer-specific or subscriber-specific programmability, wherein the broadband access network or the part thereof comprises an orchestrator node or functionality, wherein in order for improved and/or more flexible or more flexibly configurable operation of the broadband access network, the broadband access network or telecommunications network is configured such that:
 a program or configuration information is provided to or received by the orchestrator node or functionality,
 at least one piece of program or control information is provided or transmitted to the at least one programmable network node,
 the at least one piece of program or control information is activated to be executed by the respective at least one programmable network node.

Furthermore, the present invention relates to a programmable network node or an orchestrator node or functionality for improved operation of a broadband access network of a telecommunications network and/or for improved and/or more flexible or more flexibly configurable operation of the broadband access network or the telecommunications network.

Additionally, the present invention relates to a system for improved operation of a broadband access network of a telecommunications network and/or for improved and/or more flexible or more flexibly configurable operation of the broadband access network, the broadband access network comprising and/or being connected to a plurality of network nodes, wherein the plurality of network nodes comprise at least one programmable network node, wherein the broadband access network or a part thereof provides on or at the at least one programmable network node a customer-specific or subscriber-specific programmability, wherein the broadband access network or the part thereof comprises an orchestrator node or functionality,
wherein in order for improved and/or more flexible or more flexibly configurable operation of the broadband access network, the system is configured such that:
   a program or configuration information is provided to or received by the orchestrator node or functionality,
   at least one piece of program or control information is provided or transmitted to the at least one programmable network node,
   the at least one piece of program or control information is activated to be executed by the respective at least one programmable network node.

Still additionally, the present invention relates to a program comprising a computer readable program code which, when executed on a computer and/or on a orchestrator node or functionality and/or on a software defined network or policy node or functionality, or in part on the orchestrator node or functionality and in part on software defined network or policy node or functionality, causes the computer and/or the orchestrator node or functionality and/or the software defined network or policy node or functionality to perform the method according to an exemplary embodiment of the present invention.

Furthermore, the present invention relates to a computer-readable medium comprising instructions which when executed on a computer and/or on a orchestrator node or functionality and/or on a software defined network or policy node or functionality, or in part on the orchestrator node or functionality and in part on software defined network or policy node or functionality, causes the computer and/or the orchestrator node or functionality and/or the software defined network or policy node or functionality to perform the method according to an exemplary embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part might be present as well, as part of the telecommunications network 100. User equipment or client devices 55, 56 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 55, 56 to network functionalities provided by the telecommunications network 100 or via the telecommunications network 100. The client devices 55, 56 are typically connected to the logical or physical central office point of delivery 110 via a customer premises equipment device 51, 52 or via a customer premises equipment functionality that might be built in the client devices 55, 56. Preferably but not necessarily, the central office point of delivery 110 comprises a switching fabric 115 comprising a plurality of spine network nodes and typically also a plurality of leaf network nodes.

Figure 2:
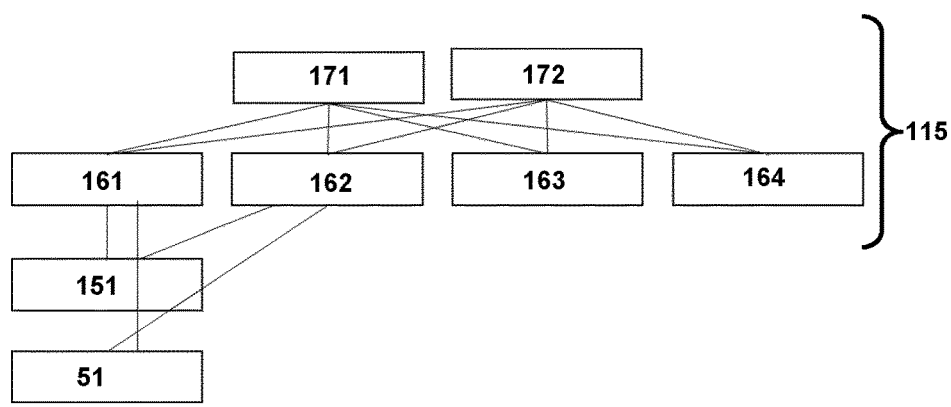
FIG. 2 schematically shows in greater detail the central office point of delivery, especially comprising a switching fabric and a certain number of components, entities and/or network nodes, as well as further entities and/or network nodes being connected to the central office point of delivery.

FIG. 2 schematically shows in greater detail the central office point of delivery 110 as typically (but not necessarily) being part of the broadband access network 120 of the telecommunications network 100, the central office point of delivery 110 comprising a certain number of components, entities and/or network nodes, as well as further entities and/or network nodes being connected thereto. The represented part of the telecommunications network 100 comprises the switching fabric 115 comprising a plurality of spine network nodes 171, 172 and typically also a plurality of leaf network nodes 161, 162, 163, 164. In the exemplary representation of the telecommunications network 100 (or part thereof) in FIG. 2, the leaf network nodes 161, 162, 163, 164 typically comprise or host the functionality of service edge nodes or entities. From an architectural (or network topological) perspective, these network nodes 161, 162, 163, 164 are—in the exemplary representation according to FIG. 2—leaf network nodes; however, from a functional perspective, these network nodes 161, 162, 163, 164 might rather be considered to be service edge network nodes 161, 162, 163, 164. This is the reason why, in the context of the present invention, the leaf network nodes 161, 162, 163, 164 are rather called service edge network nodes 161, 162, 163, 164. Additionally, FIG. 2 shows an access node 151 (being representative for, typically, a number of such access nodes or a plurality of access nodes typically present within the broadband access network 120). Such access nodes typically include line termination nodes, wherein, typically, each of the line termination nodes has one or a plurality of access node ports. The line termination nodes or access nodes might be provided to support different access technologies (e.g. digital subscriber line (DSL) technologies, or line termination nodes supporting to be connected to an optical network, especially a passive optical network (PON), typically a so-called optical line terminal (OLT) or optical line terminal device) to a home gateway or customer premises equipment 51, 52 (only one of which being represented in FIG. 2). In such a situation, a client device 55 is connected to the telecommunications network 100 (i.e. to the access node 151) via the customer premises equipment 51 (or home gateway device 51, cf. FIG. 1), and, if applicable, a network termination node. The functionality of the customer premises equipment 51, 52 (or home gateway device 51, 52, cf. FIG. 1) and the functionality of the network termination node might also be integrated in one device or "box". Even the functionality of the client device 55, 56, the functionality of the customer premises equipment 51, 52 (or home gateway device 51, 52) and the functionality of the network termination node might be integrated in one device or "box". In addition to the switching fabric 115, the central office point of delivery 110 typically also comprises central nodes or entities providing central functionalities; however, these central nodes or entities are not specifically represented in FIG. 2.

According to the present invention, a method for improved operation of a broadband access network 120 of a telecommunications network 100 and/or for improved and/or more flexible or more flexibly configurable operation of the broadband access network 120 is provided. The broadband access network 120 comprises (and/or is connected to) a plurality of network nodes 51, 52, 151, 152, 161, 162, and the plurality of network nodes 51, 52, 151, 152, 161, 162, comprise at least one programmable network node. In the following different network nodes are programmable network nodes (in different examples described hereinafter) and also network nodes having different functionalities or being positioned on different levels (within the broadband access network 120) are programmable network nodes, such as network nodes 51, 52, 162. On or at such a programmable network node 51, 52, 162, the broadband access network 120 or a part thereof provides, according to the present invention, a customer-specific or subscriber-specific programmability, especially realized via an orchestrator node or functionality 200 (cf. FIGS. 4 and 5).

Figure 3:
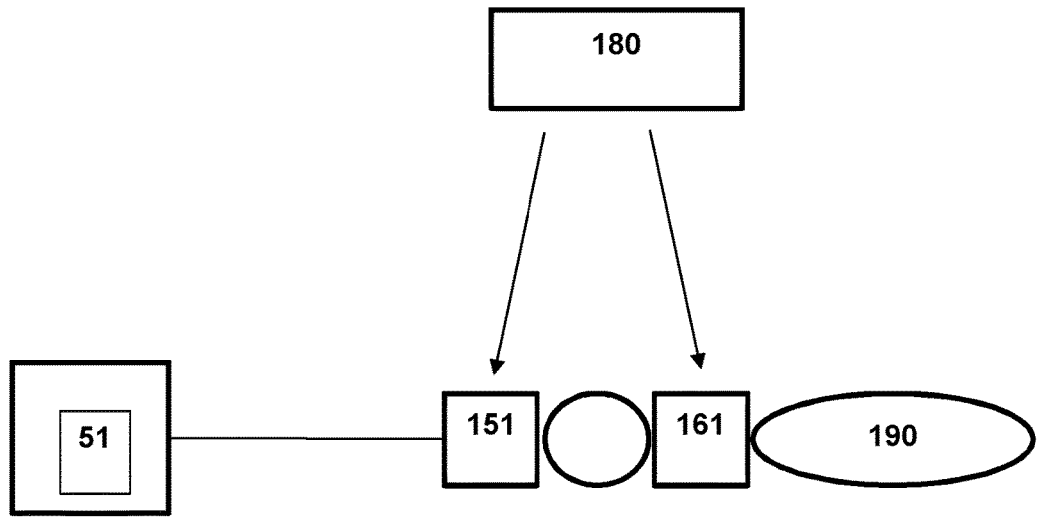
FIG. 3 schematically illustrates an example of a telecommunications network.

In FIG. 3, an example of a conventionally known telecommunications network or, rather, access network, is schematically shown, where a policy node or functionality 180 is able to distribute rather static policies to certain network nodes 51, 151, 161, typically customer premises equipment(s) 51, access node(s) 151 and/or service edge node(s) 161, and wherein the access network connects the customer premises equipment(s) 51, via the other network nodes to an IP network 190.

In contrast to such a conventionally known access network or telecommunications network, the broadband access network 120 or telecommunications network 100 according to the present invention allows for increased flexibility, hence improved and/or more flexible or more flexibly configurable operation of the broadband access network 120. This is realized, according to the present invention, via the following steps which are schematically shown in the exemplary embodiments represented in FIGS. 4 and 5:
In a first step, a program or configuration information 250' is provided to or received by the orchestrator node or functionality 200; this program or configuration information 250' being typically provided by a customer of the telecommunications network 100 or broadband access network and/or of its network operator or service provider.
In a second step, subsequent to the first step, at least one piece of program or control information 51', 52', 162', is provided or transmitted to the at least one programmable network node 51, 52, 162, and in a third step, subsequent to the second step, the at least one piece of program or control information 51', 52', 162', is activated to be executed by the respective at least one programmable network node 51, 52, 162.

Figure 4:
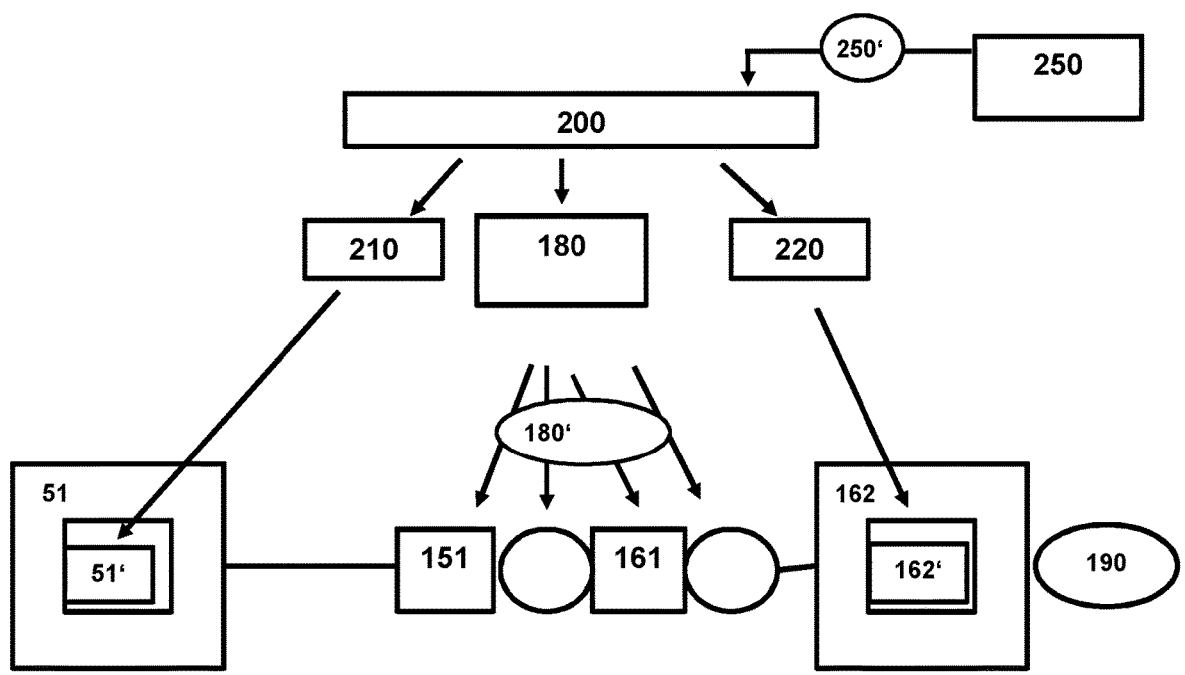
FIGS. 4 and 5 schematically illustrate, respectively, two examples of a telecommunications network or broadband access network implementing the present invention.

In FIG. 4, an exemplary realization of the present invention is shown for an implementation of a so-called hub and spoke architecture, where a customer premises equipment is connected to network nodes of the broadband access network, which connects the customer premises equipment to an IP network 190: the customer premises equipment 51 is connected (classically) via an access node 151 to a service edge node 161, and a further service edge node 162 is also present, and both the customer premises equipment 51, and the further service edge node 162 are programmable network nodes, whereas the access node 151 and the service edge node 161 are (only) configurable network nodes. Hence, the customer premises equipment device 51 as well as a secondary broadband network gateway (or further service edge node 162) are the candidate network nodes to run such tailor-made programs per customer while the intermediate node with limited programming capability remain orchestrated using the software defined network or policy node or functionality 180 (i.e. SDN/Policy controller 180). Thus, a specific customer has a customer premises equipment device (i.e. the customer premises equipment 51); this customer premises equipment device connects to an access node (i.e. the access node 151) which connects with a programmed data path to a service edge (i.e. service edge node 161) which is in this exemplary setup not programmable but configurable via policies, similarly to the access node 151. The service edge node 161 is chained to the further service edge node 162 which is realized, e.g., via an x86-based system that exposes high programmability, hence, the further service edge node 162 is a programmable network node.

Figure 5:
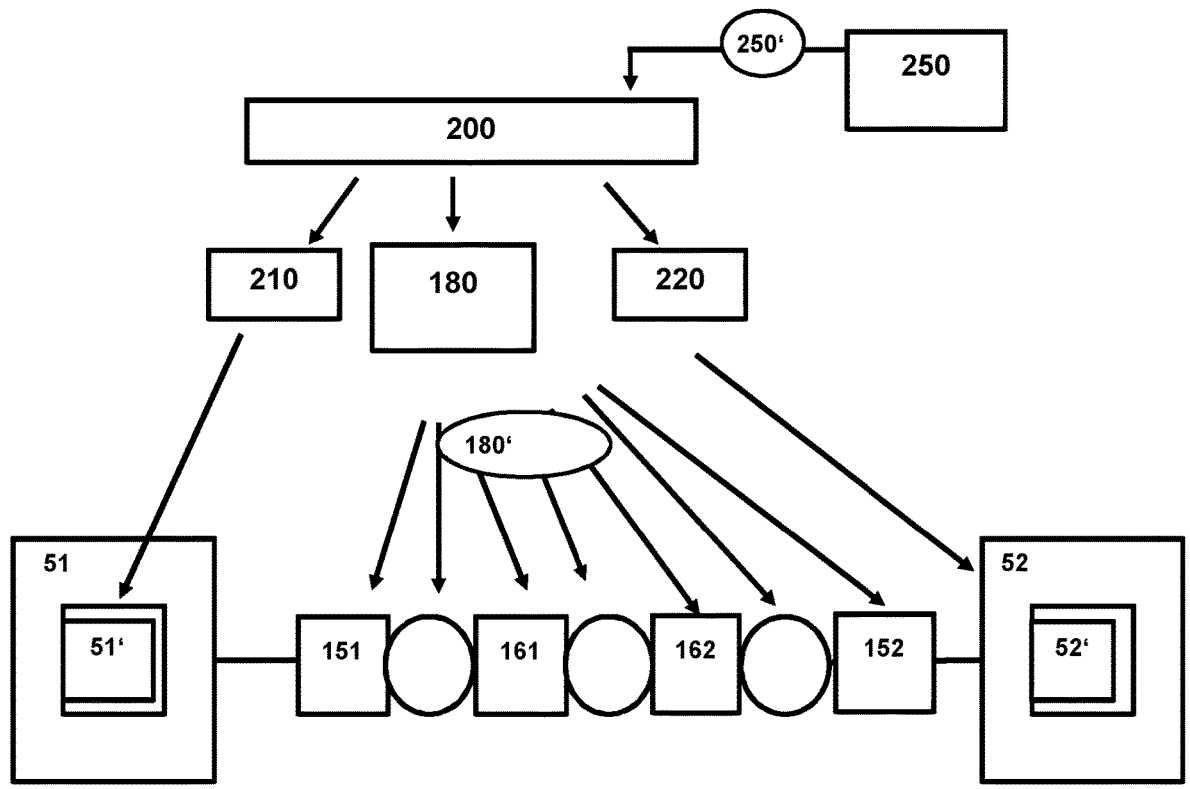

In FIG. 5, an exemplary realization of the present invention is shown for the case of a so-called point-to-point leased line situation architecture, where two customer premises equipments are connected: the first customer premises equipment 51 is connected via a first access node 151 to a first service edge node 161, and a second customer premises equipment 52 is connected via a second access node 152 to a second service edge node 162, and between both customer premises equipments 51, 52, a leased line is realized. Here, the two customer premises equipments 51, 52 are programmable network nodes, whereas the two access nodes 151, 152 and the two service edge nodes 161, 162 are (only) configurable network nodes.

In both schematically shown examples of FIGS. 4 and 5, as part of the broadband access network and/or the telecommunications network, an orchestrator node or functionality 200 provides a programmability feature towards the customer 250 such that the customer 250 is able to provide or to transmit a program or configuration information 250' to the orchestrator node or functionality 200. The orchestrator node or functionality 200 then uses the program or configuration information 250' such that both respective program or control information is transmitted to and received by the respective programmable network nodes, and configuration or policy information 180' is transmitted to and received by the respective configurable network node. In the exemplary scenario shown in FIG. 4 for a hub and spoke architecture, the customer premises equipment 51 is a programmable network node—hence, it receives respective program or control information 51'—, and the further service edge node 162 is also a programmable network nodes—hence, it receives respective program or control information 162'. The access node 151 and the service edge node 161 are configurable network nodes, and, consequently, receive their respective configuration or policy information 180'. In the exemplary scenario shown in FIG. 5 for a point-to-point leased line architecture, the first and second customer premises equipments 51, 52 are programmable network nodes— hence, they receive respective program or control information 51', 52'—, and the first and second access nodes 151, 152 as well as the first and second service edge nodes 161, 162 are configurable network nodes, and, consequently, receive their respective configuration or policy information 180'.

According to the present invention, it is preferred that via the externally provided, or customer-triggered programmability of the broadband access network 120 (or at least parts thereof) or the telecommunications network 100, it is possible to realize and implement (via the different pieces of program or control information 51', 52', 162', and via different pieces of configuration or policy information 180') a tailor-made service chain for the IP traffic of the customer or subscriber 250. Via distributing the pieces of program or control information, and of configuration or policy information, the orchestrator node or functionality 200 orchestrates the implementation (and modification) of such a service chain, thereby providing more flexibility (in defining such a service chain) and, hence, a more flexibly configurable operation of the broadband access network 120. The process itself to distribute or transmit the different pieces of program or control information 51', 52', 162', and the different pieces of configuration or policy information 180' is schematically shown in FIGS. 4 and 5, and in greater detail in FIG. 6; FIG. 7 shows the resulting situation of or within a programmable network node 51, 52, 162 according to the present invention.

According to the present invention, the program or configuration information 250' is transmitted—by the customer 250 (especially using a dynamic interface to receive the program or configuration information 250', the dynamic interface, or application programming interface, being especially provided by the orchestrator node or functionality 200)— to the orchestrator node or functionality 200, and at least one piece of program or control information 51', 52', 162' is provided or transmitted to the respective programmable network nodes 51, 52, 162. Especially, this is realized via the orchestrator node or functionality 200 comprising or being connected to at least one program interface (in the examples shown in FIGS. 4 and 5, two program interfaces, a first program interface 210 and a second program interface 220 is provided or present). In addition, the broadband access network 120 or the part thereof comprises the software defined network or policy node or functionality 180 (especially the orchestrator node or functionality 200 comprising or being connected to the software defined network or policy node or functionality 180), and the configurable network nodes 152, 161, respectively, receive at least one piece of configuration or policy information 180' from the software defined network or policy node or functionality 180. Hence, via the at least one program interface 210, 220, the respective at least one piece of program or control information 51', 52', 162' is provided or transmitted to the programmable network nodes 51, 52, 162, respectively, and via the software defined network or policy node or functionality 180, the at least one piece of configuration or policy information 180' is provided or transmitted to the configurable network nodes 152, 161, respectively.

Figure 6:
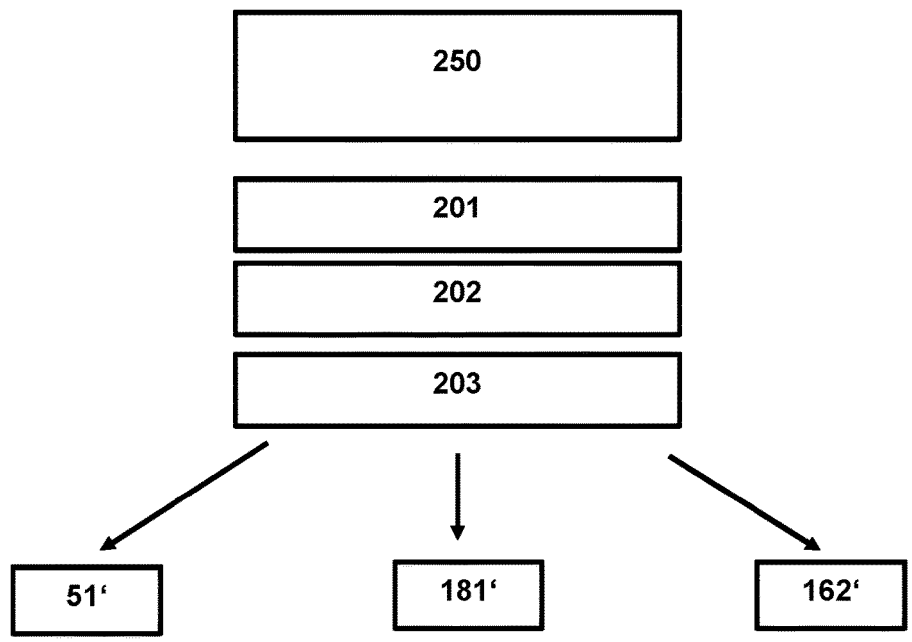
FIGS. 6 and 7 schematically illustrate different processing steps as well as the resulting situation of a programmable network node according to the present invention.
Figure 7:
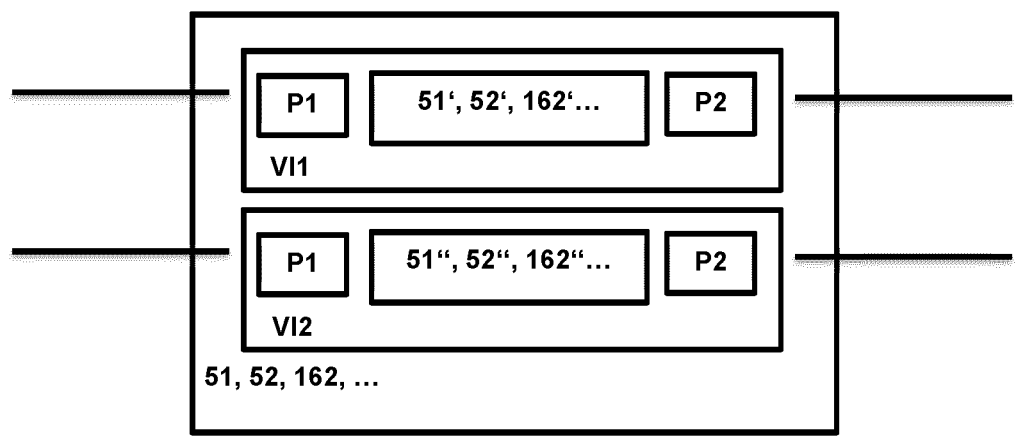

According to FIG. 6, the customer 250 provides or sends the program or configuration information 250' to the orchestrator node or functionality 200. Inside the orchestrator node or functionality 200 a syntax check (module or functionality) 201 (and/or a right (or permissions) check, i.e. a security check, and/or a consistency check) is performed. These checks are especially performed against predefined rules, i.e. predefined syntax rules and/or predefined security rules and/or predefined consistency rules; additionally meta information (such as the label $Customer-Office) are possible to be processed and/or resolved via a label resolver (module or functionality) 202. Then the corresponding policies (i.e. the respective (pieces of) configuration or policy information 180') are created and the corresponding programs (i.e. the respective (pieces of) program or control information 51',
52', 162') are generated by a policy/code generator (module or functionality) 203, and provided, especially via the program interface or program interfaces 210, 220 (these program interfaces 210, 220 especially doing a translation, e.g. in case of different device types of programmable network nodes) or via the software defined network or policy node or functionality 180, to the respective programmable network nodes 51, 52, 162 and configurable network nodes 152, 161. Hence, the orchestrator (i.e. the orchestrator node or functionality 200) installs via the program interfaces 210, 220 specific programs (i.e. program or control information 51', 52', 162') on the programmable network nodes 51, 52, 162 (especially customer premises equipments, and/or service edge nodes; however, other network nodes are possible to be used as programmable network nodes). These programs (i.e. program or control information 51', 52', 162') may, as an example, be programs that filter packets, classify packets, add labels, even up to filtering content. In parallel, the SDN/Policy controller 180 installs the data path for this chain within the network (which may be a classical access network but also e.g. an edge data center along the ONF SEBA blueprint). As an example, the access port to L2/MPLS tunnel mapping can be implemented in the access node 151 using a policy and the QoS policy may run on the service edge node 161 because this service edge node implements QoS in hardware and the further service edge node is especially good at packet processing but, perhaps, not at queueing and scheduling.

Thereby, it is advantageously possible according to the present invention, to provide and enable a maximum of programmability in the telecommunications network (especially the broadband access network) to allow creating services on the fly in an orchestrated manner. With such a setup, classical network functions like broadband network gateway (BNG) or packet data network gateway (PDN-GW) can be implemented, especially with the benefit of a dynamic interface being added on top of (or at) the orchestrator 200 that can be used by a customer 250. E.g., in case of a VPN (virtual private network) customer, the orchestrator 200 offers the customer 250 an interface in order to program the customer's VPN sites:
Meta-Example
VPN-Customer
Site FFM-7
RUN S2-code
   192.168.2.0/24 to 200.1.1.1 drop #example ACL entry
   Add MPLS label $Customer-Office #a local label used in the Customer VPN
   . . .
Apply 51-Policy
   QoS DSL 50/10
Run CPE-code
   Tag all packets <200 bytes EF #tag VoIP traffic
Such a program can be sent (by the customer 250) to the orchestrator 200 at any time, and the orchestrator provides different checks, the resolution of meta information (like the label $Customer-Office), and creates policies and programs as described above. Then, programs (i.e. the respective (pieces of) program or control information 51', 52', 162') are generated. Those can be the same as received (with resolved labels) or there can be a translation, e.g. in case of different devices types of programmable network nodes.

Policy enforcement (i.e. providing (transmitting) and activating the respective (pieces of) configuration or policy information 180') is a rather standard technique; however, for installing a program (i.e. the respective (pieces of) program or control information 51', 52', 162') in a programmable network node (such as a customer premises equipment 51, 52 or a service edge node 162), the procedure according to the present invention is especially as follows: The respective program 51', 52', 162' is loaded into a virtual instance (VI1, VI2, cf. FIG. 7) that has been created for the customer 250 within the respective programmable network node 51, 52, 162. On the programmable device (i.e. programmable network node 51, 52, 162), multiple such instances (virtual instances VI1, VI2) may exist (e.g. per access line of a customer 250). Whenever packets arrive in either direction, standard programs P1 or P2 are executed. In between those two (guarding) programs P1, P2 (that are typically only administered by the network operator due to security reasons), the program of the customer (i.e. the respective (pieces of) program or control information 51', 52', 162') is executed. Thereby, it is advantageously possible according to the present invention, that any customer is able—within the boundaries that the orchestrator 200 as well as the runtime environment in the virtual instances (VI1, VI2) and the guarding programs P1 and P2 allow—to run any type of network traffic processing code. E.g. a large enterprise customer could, for example, need to update their site's access list; in such a situation, they just update their programs and send those (i.e. the corresponding program or configuration information 250') over the automated interface to the orchestrator 200 of their service provider. Since such programs are also executable in the lab of the customer, testing can be easily done by the customer before deploying.

Hence, according to the present invention, a customer 250 of a broadband access network 120 is able to program the service provided by the network operator in combining policy configuration files as well as executable programs in a dynamic, and fully automated manner.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a broadband access network of a telecommunications network, the broadband access network comprising and/or being connected to a plurality of network nodes, wherein the plurality of network nodes comprise at least one programmable network node and at least one configurable network node, wherein the at least one configurable network node is configurable via policies, wherein the broadband access network or a part thereof provides on or at the at least one programmable network node a customer-specific or subscriber-specific programmability, wherein the broadband access network or the part thereof comprises an orchestrator node or functionality and a software defined network or policy node or functionality, wherein the method comprises:

in a first step, program or configuration information is provided to or received by the orchestrator node or functionality;

in a second step, subsequent to the first step, the orchestrator node or functionality uses the program or configuration information such that at least one piece of program or control information is provided or transmitted to the at least one programmable network node, wherein the at least one piece of program or control information corresponds to or comprises a part of a service chain for the IP traffic of a customer or subscriber of the broadband access network and/or of the telecommunications network;

in a third step, subsequent to the second step, the at least one piece of program or control information is activated to be executed by the at least one programmable network node; and in a fourth step, subsequent to the first step, the at least one configurable network node receives at least one piece of policy information from the software defined network or policy node or functionality, wherein the at least one piece of policy information matches or is adapted to the at least one piece of program or control information such that, via both the at least one piece of program or control information and the at least one piece of policy information, the service chain for the IP traffic of the customer or subscriber is able to be created in a customer-specific or subscriber-specific way.

2. The method according to claim 1, wherein the service chain is orchestrated by the orchestrator node or functionality; and wherein activity or inactivity or execution or implementation of the piece of program or control information corresponds to a state out of one or a plurality of the following: loaded, configured, activated, paused, terminated, deleted, or changed.

3. The method according to claim 1, wherein a service chain comprises or is implemented by, in sequence, a first piece of configuration or policy information, the at least one piece of program or control information, and a second piece of configuration or policy information.

4. The method according to claim 1, wherein the orchestrator node or functionality comprises or is connected to at least one program interface, wherein via the at least one program interface the at least one piece of program or control information is provided or transmitted to the at least one programmable network node;

wherein the orchestrator node or functionality provides a dynamic interface to receive the program or configuration information from the customer or subscriber; and wherein a syntax check and/or a security check and/or a consistency check is performed—by the orchestrator node or functionality and/or by the at least one program interface, and against predefined syntax and/or security and/or consistency rules—and/or meta information processed.

5. The method according to claim 1, wherein the at least one piece of program or control information realizes or is part of the service chain for the IP traffic of a customer or subscriber, the IP traffic comprising at least one stream of data packets; and wherein the at least one piece of program or control information is related to at least one out of the following:
a filter functionality for filtering data packets and/or filtering the content of data packets,
a classifier functionality for classifying data packets, or
a labelling functionality for labeling data packets.

6. The method according to claim 1, wherein the at least one programmable network node corresponds to or comprises:
at least one customer premises equipment of or associated to or assigned to the customer or subscriber;
at least one access node as part of the broadband access network, the at least one access node handling communication sessions for or associated to the customer or subscriber;
at least one service edge network node as part of the broadband access network, the at least one service edge network node handling communication sessions for or associated to the customer or subscriber; or
at least one leaf network node as part of the broadband access network.

7. The method according to claim 1, wherein the broadband access network comprises a central office point of delivery with a plurality of service edge network nodes, each one of the service edge network nodes realizes at least one service edge instance or functionality, terminating a customer communication link towards a customer premises equipment or an access node.

8. The method according to claim 1, wherein, to implement the service chain, the programmable network node is programmed to filter packets, classify packets, add labels, and/or filter content, and the configurable network node is configured to run a quality-of-service (QoS) policy.

9. The method according to claim 7, wherein the central office point of delivery comprises a switching fabric, the switching fabric comprising a plurality of spine network nodes and a plurality of leaf network nodes, wherein the leaf network nodes correspond to or host or co-host the service edge network nodes.

10. A system, comprising:
a broadband access network of a telecommunications network; and
a plurality of network nodes;
wherein the broadband access network comprises and/or is connected to the plurality of network nodes;
wherein the plurality of network nodes comprise at least one programmable network node and at least one configurable network node, wherein the at least one configurable network node is configurable via policies;
wherein the broadband access network or a part thereof provides on or at the at least one programmable network node a customer-specific or subscriber-specific programmability;
wherein the broadband access network or the part thereof comprises an orchestrator node or functionality and a software defined network or policy node or functionality;
wherein the orchestrator node or functionality is configured to receive a-program or configuration information;
wherein the orchestrator node or functionality is configured to use the program or configuration information such that at least one piece of program or control information is provided or transmitted to the at least one programmable network node, wherein the at least one piece of program or control information corresponds to or comprises a part of a service chain for the IP traffic of a customer or subscriber of the broadband access network and/or of the telecommunications network;
wherein the at least one programmable network node is configured to execute the at least one piece of program or control information, and
wherein the at least one configurable network node is configured to receive at least one piece of policy information from the software defined network or policy node or functionality, wherein the at least one piece of policy information matches or is adapted to the at least one piece of program or control information such that, via both the at least one piece of program or control information and the at least one piece of policy information, the service chain for the IP traffic of the customer or subscriber is able to be created in a customer-specific or subscriber-specific way.

11. One or more non-transitory computer-readable mediums having processor-executable instructions stored thereon for operation of a broadband access network of a telecommunications network, the broadband access network comprising and/or being connected to a plurality of network nodes, wherein the plurality of network nodes comprise at least one programmable network node and at least one configurable network node, wherein the at least one configurable network node is configurable via policies, wherein the broadband access network or a part thereof provides on or at the at least one programmable network node a customer-specific or subscriber-specific programmability, wherein the broadband access network or the part thereof comprises an orchestrator node or functionality and a software defined network or policy node or functionality, wherein the processor-executable instructions, when executed, facilitate:

in a first step, program or configuration information is provided to or received by the orchestrator node or functionality;
in a second step, subsequent to the first step, the orchestrator node or functionality uses the program or configuration information such that at least one piece of program or control information is provided or transmitted to the at least one programmable network node, wherein the at least one piece of program or control information corresponds to or comprises a part of a service chain for the IP traffic of a customer or subscriber of the broadband access network and/or of the telecommunications network;
in a third step, subsequent to the second step, the at least one piece of program or control information is activated to be executed by the at least one programmable network node, and
in a fourth step, subsequent to the first step, the at least one configurable network node receives at least one piece of policy information from the software defined network or policy node or functionality, wherein the at least one piece of policy information matches or is adapted to the at least one piece of program or control information such that, via both the at least one piece of program or control information and the at least one piece of policy information, the service chain for the IP traffic of the customer or subscriber is able to be created in a customer-specific or subscriber-specific way.

\* \* \* \* \*